(12) United States Patent
Edwards et al.

(10) Patent No.: US 10,412,080 B1
(45) Date of Patent: Sep. 10, 2019

(54) AUTHENTICATING A USER DEVICE VIA A MONITORING DEVICE

(71) Applicant: Capital One Services LLC, McLean, VA (US)

(72) Inventors: Joshua Edwards, Philadelphia, PA (US); Adam Vukich, Alexandria, VA (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/249,526

(22) Filed: Jan. 16, 2019

(51) Int. Cl.
*H04L 29/06* (2006.01)
*H04L 29/12* (2006.01)
*G06F 17/20* (2006.01)

(52) U.S. Cl.
CPC ...... *H04L 63/0853* (2013.01); *H04L 61/2007* (2013.01); *H04L 63/083* (2013.01); *H04L 63/0861* (2013.01); *H04L 63/0876* (2013.01); *H04L 63/101* (2013.01); *G06F 17/20* (2013.01); *H04L 2463/082* (2013.01)

(58) Field of Classification Search
CPC ............ H04L 63/0853; H04L 63/0861; H04L 61/2007; H04L 63/101; H04L 63/0876; H04L 63/083; H04L 2463/082; H04L 9/3234; H04L 9/32; G06F 17/20
See application file for complete search history.

(56) References Cited

U.S. PATENT DOCUMENTS

| 7,869,577 | B2 * | 1/2011 | Arnison | G06F 3/16 379/88.01 |
| 8,006,291 | B2 * | 8/2011 | Headley | H04L 9/3271 713/186 |
| 8,183,998 | B2 * | 5/2012 | Rao | A61B 5/0031 340/539.12 |
| 8,412,626 | B2 * | 4/2013 | Hirson | G06Q 20/32 705/35 |
| 8,914,851 | B2 * | 12/2014 | Fakhrai | G06F 21/41 709/229 |
| 8,914,875 | B2 * | 12/2014 | Matus | G06F 21/32 726/17 |
| 9,049,299 | B2 * | 6/2015 | Nord | H04L 65/403 |

(Continued)

FOREIGN PATENT DOCUMENTS

EP 2916520 A1 * 9/2015 ............ H04W 4/029

*Primary Examiner* — John B King
(74) *Attorney, Agent, or Firm* — Harrity & Harrity, LLP

(57) ABSTRACT

A server device receives, from a user device, a session initiation request and information identifying a location of the user device, and receives, from a monitoring device that is separate from the user device, an authentication request and information identifying a location of the monitoring device. The server device processes the session initiation request and the authentication request to authenticate a user of the user device, and determines, based on the location of the user device and the location of the monitoring device, that the user device and the monitoring device are collocated. The server device creates, after authenticating the user of the user device and determining that user device and the monitoring device are collocated, a session token, and sends the session token to the user device to enable the user device to access at least one resource of the server device.

20 Claims, 10 Drawing Sheets

(56) References Cited

U.S. PATENT DOCUMENTS

| | | | |
|---|---|---|---|
| 9,491,033 B1* | 11/2016 | Soyannwo | G10L 17/22 |
| 9,913,026 B2* | 3/2018 | Ahgren | H04R 1/08 |
| 9,922,323 B2* | 3/2018 | Buhrmann | G06Q 20/40 |
| 10,075,847 B1* | 9/2018 | Moreton | H04W 12/06 |
| 10,135,805 B2* | 11/2018 | Khalid | H04L 63/0815 |
| 10,158,646 B1* | 12/2018 | Desai | H04L 63/102 |
| 10,200,454 B1* | 2/2019 | Lewis | H04L 67/10 |
| 2014/0188468 A1* | 7/2014 | Dyrmovskiy | G10L 17/04 704/235 |
| 2017/0180343 A1 | 6/2017 | de Ganon et al. | |

* cited by examiner

AUTHENTICATING A USER DEVICE VIA A MONITORING DEVICE

BACKGROUND

A monitoring device may include a microphone, a camera, a speaker, a display and/or the like. A user may direct the monitoring device to perform an action by uttering one or more words, making one or more facial gestures, making one or more hand gestures, and/or the like.

SUMMARY

According to some implementations, a server device may include one or more memories, and one or more processors, communicatively coupled to the one or more memories, to receive a first message from a user device, wherein the first message includes a session initiation request, and an internet protocol (IP) address of the user device. The one or more processors may receive a second message from a monitoring device, wherein the second message includes an authentication request, and an IP address of the monitoring device. The one or more processors may process the session initiation request and the authentication request to authenticate the user device, the monitoring device, or a user of the user device. The one or more processors may determine, based on the IP address of the user device and the IP address of the monitoring device, that the user device and the monitoring device are collocated. The one or more processors may create, based on authenticating the user device, the monitoring device, or the user of the user device and determining that the user device and the monitoring device are collocated, a session token, and may send the session token to the user device to enable the user device to access at least one resource of the server device.

According to some implementations, a non-transitory computer-readable medium may store instructions that include one or more instructions that, when executed by one or more processors of a server device, cause the one or more processors to receive, from a user device, a session initiation request and information identifying a location of the user device, and to receive, from a monitoring device that is separate from the user device, an authentication request and information identifying a location of the monitoring device. The one or more instructions may cause the one or more processors to process the session initiation request and the authentication request to authenticate a user of the user device, and to determine, based on the location of the user device and the location of the monitoring device, that the user device and the monitoring device are collocated. The one or more instructions may cause the one or more processors to create, after authenticating the user of the user device and determining that user device and the monitoring device are collocated, a session token, and to send the session token to the user device to enable the user device to access at least one resource of the server device.

According to some implementations, a method may include receiving, by a server device and from a user device, a session initiation request, and receiving, by the server device and from a monitoring device, an authentication request. The method may include authenticating, by the server device and based on the session initiation request and the authentication request, a user of the user device, and determining, by the server device, that the user device and the monitoring device are collocated. The method may include creating, by the server device after authenticating the user of the user device and after determining that user device and the monitoring device are collocated, a session token, and sending, by the server device, the session token to the user device to permit the user device to access at least one resource associated with the server device.

DETAILED DESCRIPTION

Figure 1A:
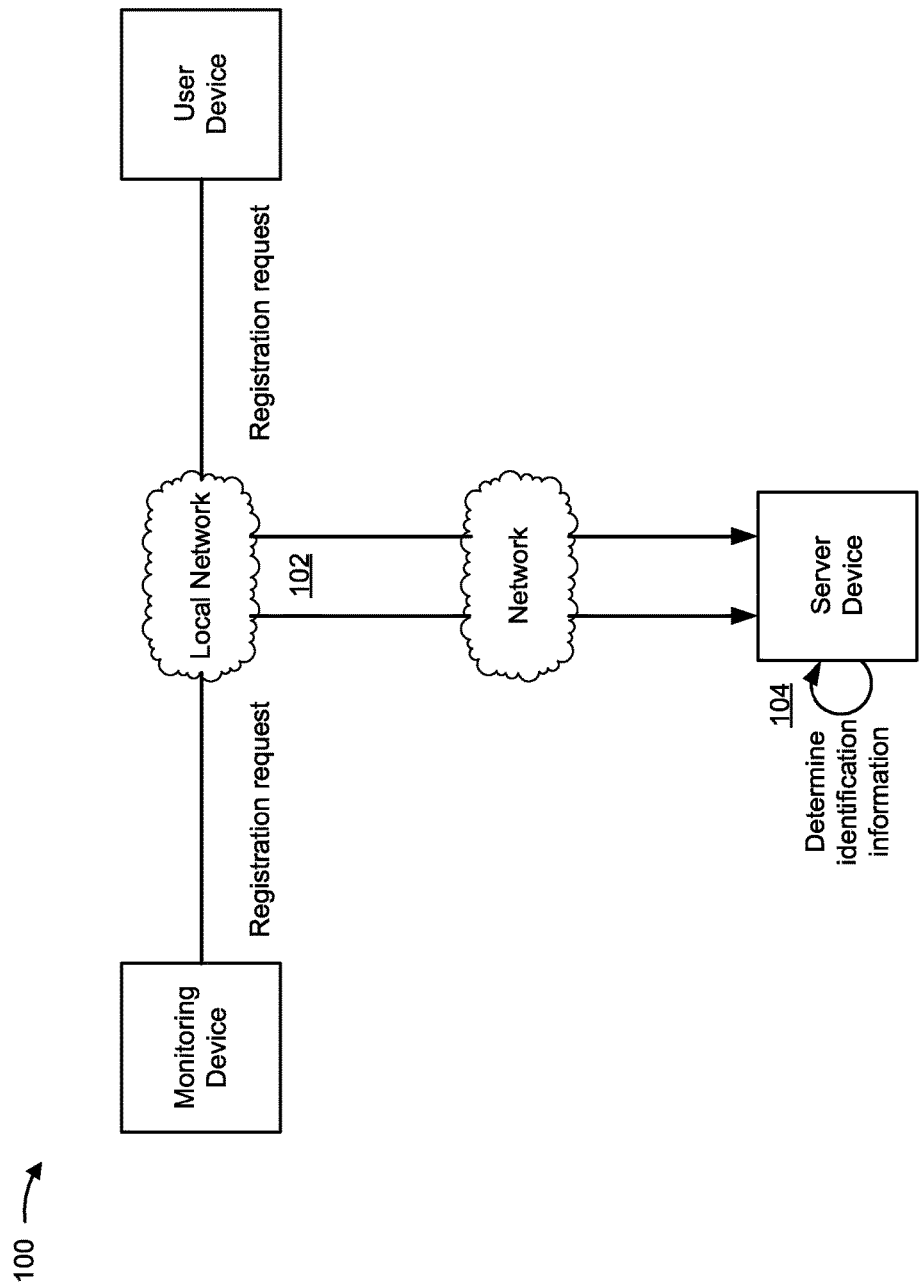
FIGS. 1A-1E are diagrams of an example implementation described herein.

The following detailed description of example implementations refers to the accompanying drawings. The same reference numbers in different drawings may identify the same or similar elements.

In many cases, a user uses a user device to initiate a communication session with a server device. In some cases, the communicating session involves sending sensitive information (e.g., confidential information, secret information, personal information, and/or the like) to the server device. In some cases, the user enters user identification information (e.g., a username, user id, password, passcode, personal identification number (PIN), and/or the like) into the user device and the user device sends the user identification information to the server device for the server device to authenticate the user and initiate a communication session that is secure (e.g., a communication session that is encrypted). However, user identification information can become compromised (e.g., the user identification information may be stolen, hacked, and/or the like) and a bad actor may be able to impersonate the user and/or the user device to access sensitive information stored by the server device.

Some implementations described herein provide a server device that communicates with a user device and a monitoring device to authenticate a user, the user device, and/or the monitoring device. In some implementations, the server device receives a session initiation request from the user device and an authentication request from the monitoring device. According to some implementations, the server device may authenticate the user, the user device, and/or the monitoring device based on the session initiation request and the authentication request. In some implementations, the server device may determine that the monitoring device and the user device are collocated. In some implementations, the server device may, based on authenticating the user, the user device, and/or the monitoring device, and determining that the monitoring device and the user device are collocated, create a session token. In some implementations, the server device may send the session token to the user device to initiate the session and enable the user device to access at least one resource associated with the server device.

In this way, the server device enables a session to authenticate a user, a user device, and/or a monitoring device by communicating with the user device and the monitoring device, which may enhance the security of the authentication process. For example, the authentication process requires two separate devices to communicate with the server device, which means that a bad actor must compromise and/or imitate both devices to be able to authenticate the user, the user device, and/or the monitoring device. This authentication process increases the complexity, and therefore the security, to initiate a communication session with the server device to access sensitive information. Moreover, the server device determines that the user device and the monitoring device are collocated before creating a session token, which enhances the security of the communication session initiation process by ensuring that the user is interacting with the user device and the monitoring device at the same time in the same location. Further, in some implementations, the server device passively receives the session initiation request and the authentication request, which may conserve resources (e.g., processing resources, memory resources, network resources, power resources, and/or the like) of the server device that would otherwise be wasted using other types of authentication processes (e.g., multi-factor authentication (MFA), out-of-band authentication (OOB), and/or the like) that require active processing and communication by the server device.

FIGS. 1A-1E are diagrams of an example implementation 100 described herein. As shown in FIG. 1A, example implementation 100 may include a monitoring device, a user device, and/or a server device. In some implementations, the monitoring device may include a microphone, a camera, a biometric sensor (e.g., a fingerprint reader, a retina scanner, and/or the like), a speaker, a display, and/or the like for providing hands-free assistance to a user. For example, the monitoring device may be a smart, always-on monitoring device, such as an Amazon Echo, a Google Home, an Apple HomePod, and/or the like, that performs an action and/or provides information to a user upon detecting an audible command (e.g., a voice command and/or the like) and/or a gesture command (e.g., a facial gesture command, an eye gesture command, a hand gesture command, and/or the like).

In some implementations, the monitoring device may be separate from the user device. In some implementations, the monitoring device and the user device may be on a local network. In some implementations, the monitoring device and the user device may communicate via the local network. In some implementations, the monitoring device and the user device may communicate with the server device via the local network and/or a device, such as a modem, router, and/or the like, associated with the local network via a network, such as the internet. In some implementations, the monitoring device, the user device, and the server device may communicate via the network (e.g., without communicating via the local network).

As shown in FIG. 1A and reference number 102, the monitoring device and/or the user device may send respective registration requests to the server device. For example, the user device may send a first registration request to the server device via the local network and/or the network. In some implementations, the user may direct the user device (e.g., by interacting with a user interface of the user device, such as a keyboard, a touchscreen display, and/or the like), to send the first registration request to the server device (e.g., by directing the user device to download an application and/or a program, such as a browser, a browser extension, and/or the like; link the user device to an account, such as an online account, associated with the user; and/or the like). In some implementations, the first registration request may include information concerning the user device, such as an identification string associated with the user device (e.g., a serial number), a network address of the user device, such as an internet protocol (IP) address, information identifying a physical location of the user device (e.g., a latitude and longitude), information identifying a local network to which the user device is connected (e.g., a name of the local network), and/or the like.

As another example, the monitoring device may send a second registration request to the server device via the local network and/or the network. In some implementations, the user may direct the monitoring device (e.g., by uttering one or more audible commands and/or making one or more gesture commands) to send the second registration request to the server device (e.g., by directing the monitoring device to download an application and/or program; learn a new skill or action; link to the account associated with the user, and/or the like). In some implementations, the second request may include information concerning the monitoring device, such as an identification string associated with the monitoring device, a network address of the monitoring device, such as an IP address, information identifying a physical location of the monitoring device, information identifying a local network to which the monitoring device is connected, and/or the like. In some implementations, the first registration request and/or the second registration request may include information concerning the user, such as an identity of the user, a username of the user, a password of the user, one or more pieces of biometric information associated with the user, and/or the like.

In some implementations, the server device may receive the first registration request from the user device and/or the second registration request from the monitoring device. As shown by reference number 104, the server device may determine, based on the first registration request and/or the second registration request, information concerning the user device, the monitoring device, and/or the user. For example, the server device may parse the first registration request to determine identification information concerning the user device and/or the user. As another example, the server device may parse the second registration request to determine identification information concerning the monitoring device and/or the user. In some implementations, the server device may store the information concerning the user device, the monitoring device, and/or the user.

Figure 1B:
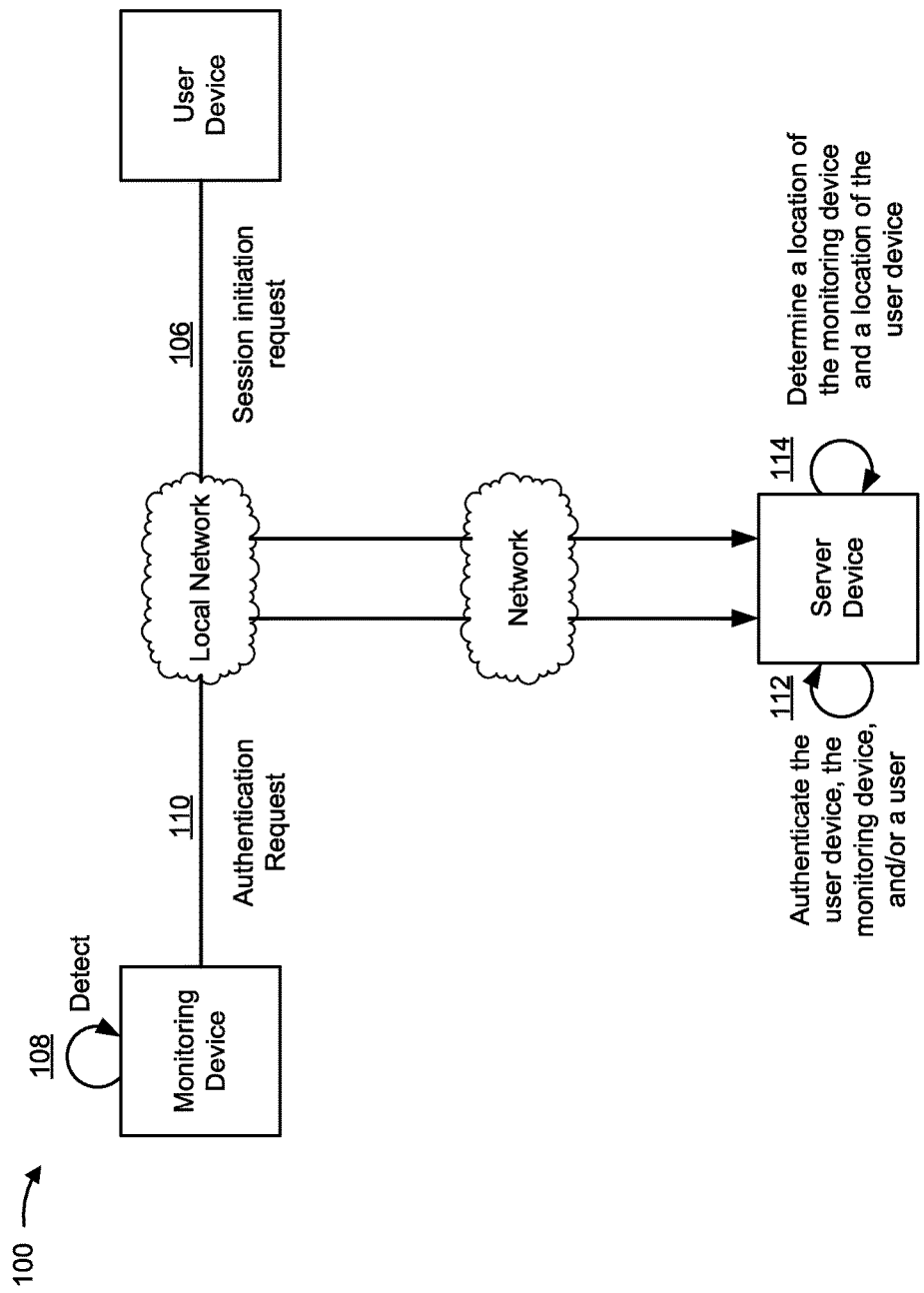

As shown in FIG. 1B and reference number 106, the user device may generate and send a session initiation request to the server device. In some implementations, the user device may send the session initiation request to the server device to initiate a secure communication session with the server device for an application and/or program running on the user device, such as a browser, a browser extension, and/or the like. For example, the user may enter user identifying information, such as a username, an account number, a personal identification string, and/or the like into a browser extension associated with an organization, such as a financial institution, a social media company, a healthcare provider, and/or the like, which causes the user device to send the session initiation request to a server device of the organization. In some implementations, the session initiation request may include information concerning the session, such as the user identifying information, a type of session requested, and/or the like.

In some implementations, the user device may send the session initiation request and information concerning the user device, such as the identification string associated with the user device, the network address of the user device, such as the IP address of the user device, the information identifying the physical location of the user device, the information identifying a local network to which the user device is connected, and/or the like to the server device. In some implementations, the user device may generate a first message that includes the session initiation request and the information concerning the user device and send the first message to the server device.

As shown by reference number 108, the monitoring device may detect an audible command and/or gesture command. For example, the microphone of the monitoring device may always be on to detect the audible command. As another example, the camera of the monitoring device may always be on to detect the gesture command. In some implementations, the monitoring device may receive and process the audible command and/or gesture command to determine that the audible command and/or gesture command are related to the session initiation request. For example, the user may utter one or more words (e.g., "My password for my session request is 'swordfish'") and the monitoring device may capture the one or more words and determine that the one or more words indicate a password that is related to the session initiation request. As another example, the user may make one or more gestures (e.g., point at the monitoring device with the user's hand, wrinkle the user's nose, move the user's eyes in a specific pattern, and/or the like) and the monitoring device may capture the one or more gestures and determine that the one or more gestures are related to the session initiation request.

As shown by reference number 110, the monitoring device may generate, based on the audible command and/or gesture command, an authentication request. In some implementations, the authentication request may include audio data concerning the audible command and/or the user, video data concerning the gesture command and/or the user, an biometric data concerning the audible command, the gesture command, and/or the user, and/or the like. In some implementations, the monitoring device may send the authentication request to the server device. In some implementations, the monitoring device may send the authentication request to the server device to provide authentication for the session initiation request.

In some implementations, the monitoring device may send the authentication request and the information concerning the monitoring device, such as the identification string associated with the monitoring device, the network address of the monitoring device, such as the IP address of the monitoring device, the information identifying the physical location of the monitoring device, the information identifying a local network to which the monitoring device is connected, and/or the like. In some implementations, the monitoring device may generate a second message that includes the authentication request and the information concerning the monitoring device and send the second message to the server device.

As shown by reference number 112, the server device may authenticate the user device, the monitoring device, and/or the user. In some implementations, the server device may receive the session initiation request and/or the authentication request and process the initiation request and/or the authentication request to authenticate the user device, the monitoring device, and/or the user. In some implementations, the server device may receive the first message and/or the second message, parse the first message and/or the second message to identify the session initiation request and/or the authentication request, and process the initiation request and/or the authentication request to authenticate the user device, the monitoring device, and/or the user. In some implementations, the server device may determine, after receiving the first message, a period of time during which the second message is to be received (e.g., a security window of time in which the second message must be received to facilitate authenticating the user device, the monitoring device, and/or the user) and may determine, after receiving the second message, that the server device received the second message within the period of time (e.g., the server device received the second message during the security window of time and that therefore the server device may use the second message to facilitate authenticating the user device, the monitoring device, and/or the user).

In some implementations, the server device may process the session initiation request and/or the authentication request to determine identification information concerning the user device, the monitoring device, or the user of the user device. In some implementations, the server device may compare the identification information and stored identification information concerning the user device, the monitoring device, and/or the user (e.g. the information concerning the user device, the monitoring device, and/or the user determined by the server device based on the first registration request of the user device and the second registration request of the monitoring device) to authenticate the user device, the monitoring device, and/or the user. In some implementations, the server device may determine that a password included in the authentication request is associated with a username included in the session initiation request to authenticate the user device, the monitoring device, and/or the user.

In some implementations, the server device may process the session initiation request to determine and/or identify the user. In some implementations, the server device may, based on determining and/or identifying the user, determine an audio profile of the user, such as a voice profile, a word cadence profile, and/or the like; a video profile of the user, such as a visual profile of the user, a visual gesture profile of the user, and/or the like; a biometric profile of the user, such as fingerprint profile of the user, a retina profile of the user, and/or the like; and/or the like. For example, the server device may perform a lookup concerning user information stored in a storage device to obtain the audio profile of the user, the video profile of the user, and/or the biometric profile of the user.

In some implementations, the server device may process the authentication request to determine and/or identify the audio data, the video data, and/or the biometric data included in the authentication request. For example, the server device may parse the authentication request to identify the audio data, the video data, and/or the biometric data. In some implementations, the server device may process the audio data using an audio processing technique, such as a natural language processing technique, to determine and/or identify a voice, one or more words, one or more voice characteristics, and/or the like of the audio data, and/or the like. In some implementations, the server device may process the video data using a video processing technique, such as a facial recognition technique, to determine and/or identify a face, one or more facial expressions, one or more visual characteristics, and/or the like of the video data. In some implementations, the server device may process the biometric data using a biometric identification technique, such as a fingerprint identification technique, a retina scanning technique, and/or the like, to identify one or more fingerprints, one or more retinas, one or more biometric characteristics, and/or the like of the biometric data.

In some implementations, the server device may authenticate the user device, the monitoring device, and/or the user based on the audio profile of the user and/or the voice, the one or more words, the one or more voice characteristics, and/or the like of the audio data. For example, the server device may compare the voice profile of the user and the one or more voice characteristics of the audio data to determine that the voice profile of the user matches the one or more voice characteristics of the audio data within a particular threshold. As another example, the server device may obtain a password concerning the user from a storage device and compare the password and the one or more words of the audio data to determine that the password matches the one or more words of the audio data.

In some implementations, the server device may authenticate the user device, the monitoring device, and/or the user based on the video profile of the user and/or the face, the one or more facial expressions, the one or more visual characteristics, and/or the like of the video data. For example, the server device may compare the visual profile of the user and the one or more visual characteristics of the video data to determine that the visual profile of the user matches the one or more visual characteristics of the video data within a particular threshold. As another example, the server device may compare the visual gesture profile of the user and the one or more visual expressions of the video data to determine that the visual gesture profile of the user matches the one or more visual expressions of the video data within a particular threshold. In some implementations, the server device may authenticate the user device, the monitoring device, and/or the user based on the biometric profile of the user and/or the one or more fingerprints, the one or more retinas, the one or more biometric characteristics, and/or the like of the biometric data. For example, the server device may compare the biometric profile of the user and the one or more biometric characteristics of the biometric data to determine that the biometric profile of the user matches the one or more biometric characteristics of the biometric data within a particular threshold.

In some implementations, the server device may authenticate the user device, the monitoring device, and/or the user based on the audio profile of the user; the voice, the one or more words, the one or more voice characteristics, and/or the like of the audio data; the video profile of the user; the face, the one or more facial expressions, the one or more visual characteristics, and/or the like of the video data; the biometric profile of the user; and/or the one or more fingerprints, the one or more retinas, the one or more biometric characteristics, and/or the like of the biometric data. For example, the server device may compare the voice profile of the user and the voice of the audio data and/or the visual profile of the user and the face of the video data to determine that the voice profile of the user matches the voice of the audio data within a particular threshold and/or that the visual profile of the user matches the face of the video data within a particular threshold.

As shown by reference number 114, the server device may determine a location of the user device and/or a location of the monitoring device. For example, the server device may parse the information concerning the user device included in the first message to determine and/or identify the information identifying the physical location of the user device and may parse the information concerning the monitoring device included in the second message to determine and/or identify the information identifying the physical location of the monitoring device. As another example, the server device may parse the information concerning the user device included in the first message to determine and/or identify the network address, such as the IP address, of the user device and may parse the information concerning the monitoring device included in the second message to determine and/or identify the network address, such as the IP address, of the monitoring device. As an additional example, the server device may parse the information concerning the user device included in the first message to determine and/or identify the local network to which the user device is connected and may parse the information concerning the monitoring device included in the second message to determine and/or identify the local network to which the monitoring device is connected.

In some implementations, the server device may determine, based on the location of the user device and the location of the monitoring device, that the user device and the monitoring device are collocated. For example, the server device may determine, based on the network address of the user device (e.g., the IP address of the user device) and the network address of the monitoring device (e.g., the IP address of the monitoring device), that the user device and the monitoring device are collocated (e.g., because the server device and monitoring device share the same network address (e.g., the same IP address) due to the user device and the monitoring device being on the local network and communicating with the server device via the device associated with the local network (e.g., the modem, router, and/or the like)). As another example, the server device may determine, based on the physical location of the user device and the physical location of the monitoring device, that the user device is located within a threshold distance of the monitoring device (e.g., 3 meters, 10 meters, 25 meters, 100 meters, and/or the like) and that therefore the user device and the monitoring device are collocated. In a further example, the server device may determine, based on the physical location of the user device and the physical location of the monitoring device, that the user device is located within a proximity area of the monitoring device (e.g., a geographic radius around the monitoring device) and that therefore the user device and the monitoring device are collocated. In another example, the server device may determine that the user device and the monitoring device are connected to the same local network.

Figure 1C:
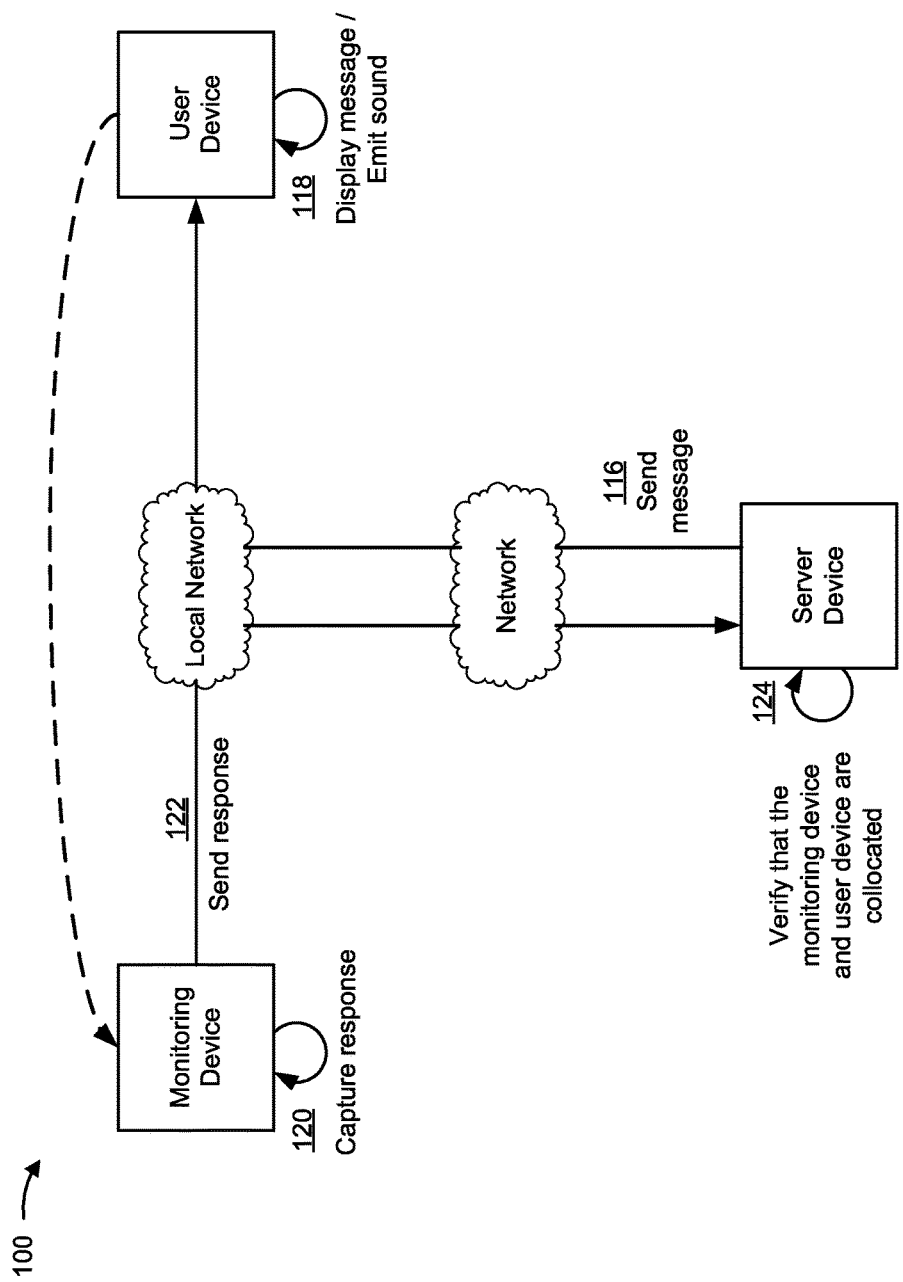

As shown in FIG. 1C, the server device may send a message to the user device to verify that the user device and the monitoring device are collocated. As shown by reference number 116, the server device may generate and send the message to the user device. In some implementations, the message may include an instruction that instructs or prompts the user to utter an audible response, make a facial gesture response, make a hand gesture response, and/or the like concerning the instruction that can be detected by the monitoring device. For example, the instruction may instruct the user to say the user's name so that the monitoring device can detect and capture a response of the user, such as the user's utterance of the user's name. As shown by reference number 118, the user device may receive and process the message, which causes the user device to display the message and/or the instruction on the display of the user device. In some implementations, the message may include media data, such that the user device emits one or more sounds, displays one or more images and/or one or more videos, and/or the like upon receiving and processing the media data.

As shown by reference number 120, the monitoring device may capture the audible response, the facial gesture response, the hand gesture response, and/or the like of the user; the one or more sounds emitted by the user device; the one or more images and/or the one or more videos displayed by the user device; and/or the like. As shown by reference number 122, the monitoring device may send, to the server device, information concerning the audible response, the facial gesture response, the hand gesture response, and/or the like of the user; the one or more sounds emitted by the user device; the one or more images and/or the one or more videos displayed by the user device; and/or the like. In some implementations, the monitoring device may generate and send, to the server device, a message comprising the information concerning the audible response, the facial gesture response, the hand gesture response, and/or the like of the user; the one or more sounds emitted by the user device; the one or more images and/or the one or more videos displayed by the user device; and/or the like.

As shown by reference number 124, the server device may receive and process the message sent by the monitoring device. In some implementations, the server device may process the information concerning the audible response, the facial gesture response, the hand gesture response, and/or the like of the user; the one or more sounds emitted by the user device; the one or more images and/or the one or more videos displayed by the user device; and/or the like included in the message to determine that the user device and the monitoring device are collocated. For example, the server device may determine that the information concerning the one or more sounds emitted by the user device (that was captured by the monitoring device) matches and/or is consistent with the media data the server device sent to the user device. In this way, the server device may provide an extra step to verify that the monitoring device and the user device are collocated, which may improve security for establishing the session.

Some example implementations, with respect to FIG. 1C and reference numbers 116-124, show the server device generating and sending the message to the user device, the user device processing the message to present information, the monitoring device capturing a response to the information and sending the response to the server device for the server device to process the response to determine that the user device and monitoring device are collocated, but implementations include the server device generating and sending the message to the monitoring device, the monitoring device processing the message to present the information, the user device capturing the response and sending the response to the server device for the server device to process the response to determine that the user device and monitoring device are collocated.

Figure 1D:
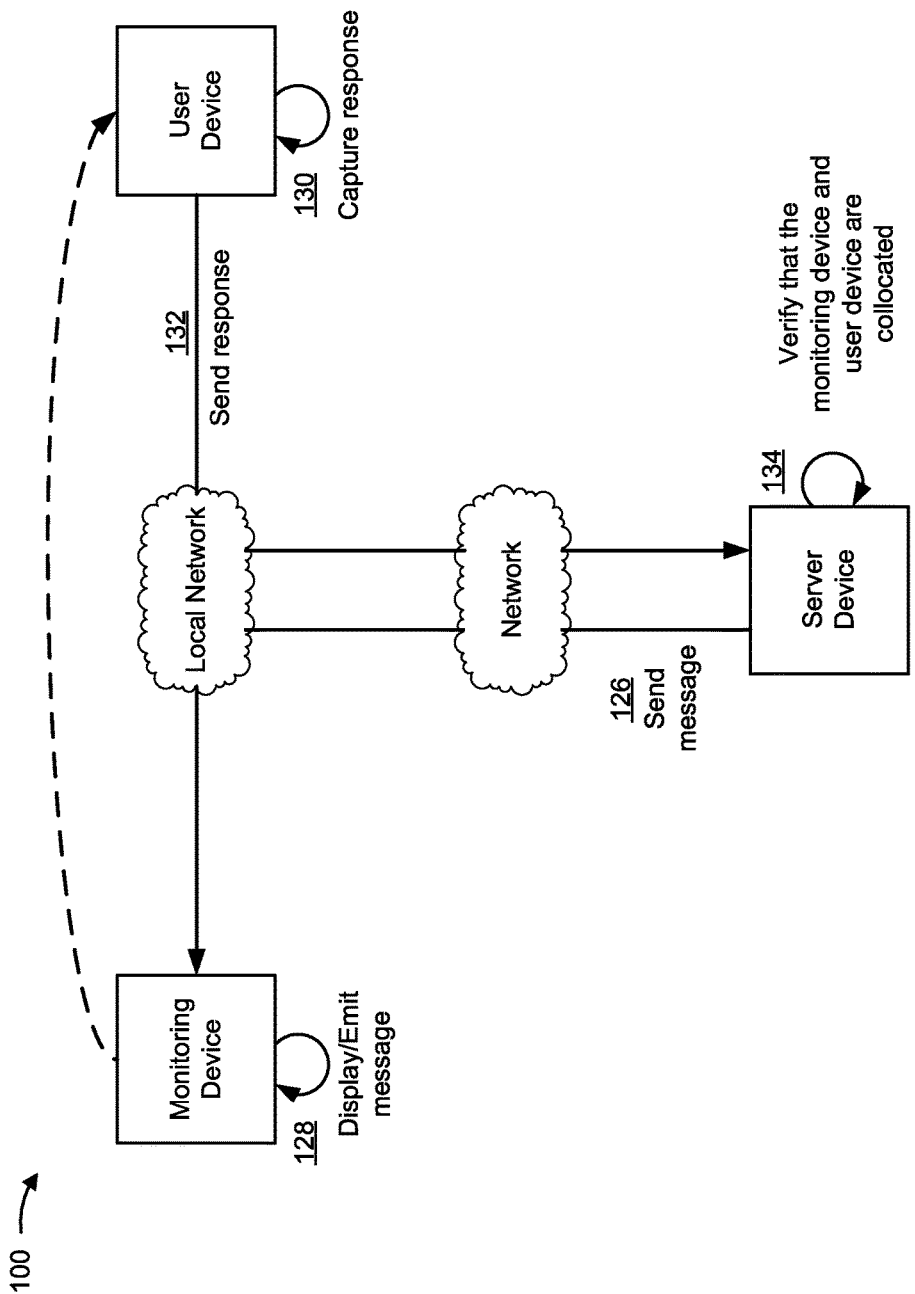

As shown in FIG. 1D, the server device may, in addition to or alternatively to the process described in connection with FIG. 1C, send a message to the monitoring device to verify that the user device and the monitoring device are collocated. As shown by reference number 126, the server device may generate and send the message to the monitoring device. In some implementations, the message may include an instruction, a question, and/or the like that instructs the user to provide an input response to the user device (e.g., enter a response via a user interface of the user device). As shown by reference number 128, the monitoring device may receive and process the message, which causes the monitoring device to display the message, the instruction, the question, and/or the like on the display of the monitoring device, emit the message, the instruction, the question, and/or the like via a speaker of the monitoring device, and/or the like. For example, the monitoring device may process the message, which causes the monitoring device to ask the question via the speaker of the monitoring device.

As shown by reference number 130 the user device may capture the input response. For example, the user may enter the input response via a keyboard, touchscreen, mouse, and/or the like of the user device. As shown by reference number 132, the user device may send, to the server device, information concerning the input response. In some implementations, the user device may generate and send a message comprising the information concerning the input response. As shown by reference number 134, the server device may receive and process the message sent by the user device. In some implementations, the server device may process the information concerning the input response included in the message to determine that the user device and the monitoring device are collocated. For example, the server device may determine that the input response matches and/or is consistent with the instruction the server device sent to the monitoring device. In this way, the server device may provide an extra step to verify that the monitoring device and the user device are collocated, which may improve security for establishing the session.

Some example implementations, with respect to FIG. 1D and reference numbers 126-134, show the server device generating and sending the message to the monitoring device, the monitoring device processing the message to present information, the user device capturing a response to the information and sending the response to the server device for the server device to process the response to determine that the user device and monitoring device are collocated, but implementations include the server device generating and sending the message to the user device, the user device processing the message to present the information, the monitoring device capturing the response to the information and sending the response to the server device for the server device to process the response to determine that the user device and monitoring device are collocated.

Figure 1E:
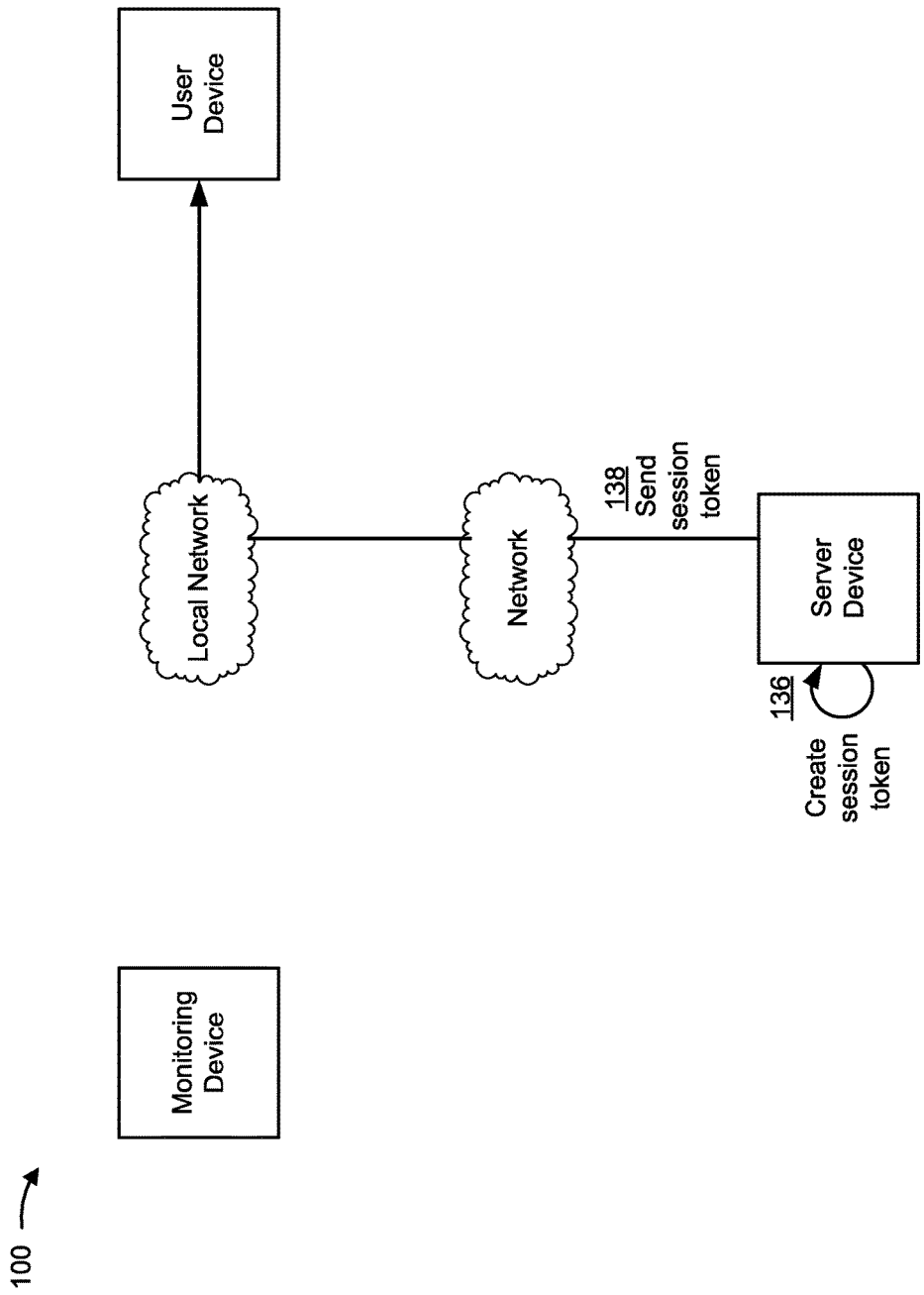

As shown in FIG. 1E and reference number 136, the server device may create a session token, such as a cookie, a hypertext transfer protocol (HTTP) parameter, a session identifier, or anything else that may be used to identify the session. In some implementations, the server device may create the session token based on authenticating the user device, the monitoring device, and/or the user of the user device. In some implementations, the server device may create the session token based on determining and/or verifying that the user device and the monitoring device are collocated. In some implementations, the session token enables the user device to access one or more resources of the server device and/or a different server device. In some implementations, the session token enables the application and/or the program, such as the browser, the browser extension, and/or the like of user device to communicate with the server device and/or the different server device to access the one or more resources. As shown by reference number 138, the server device may send the session token to the user device. In some implementations, the user device may send a request concerning the session token (e.g., a query regarding whether the server device created the session token) and the server device may send, based on the request, the session token to the user device. In some implementations, the server device may send the session token to the user device to initiate the session. Thereafter, the user device and server device may communicate via the session.

As indicated above, FIGS. 1A-1E are provided merely as an example. Other examples may differ from what was described with regard to FIGS. 1A-1E.

Figure 2:
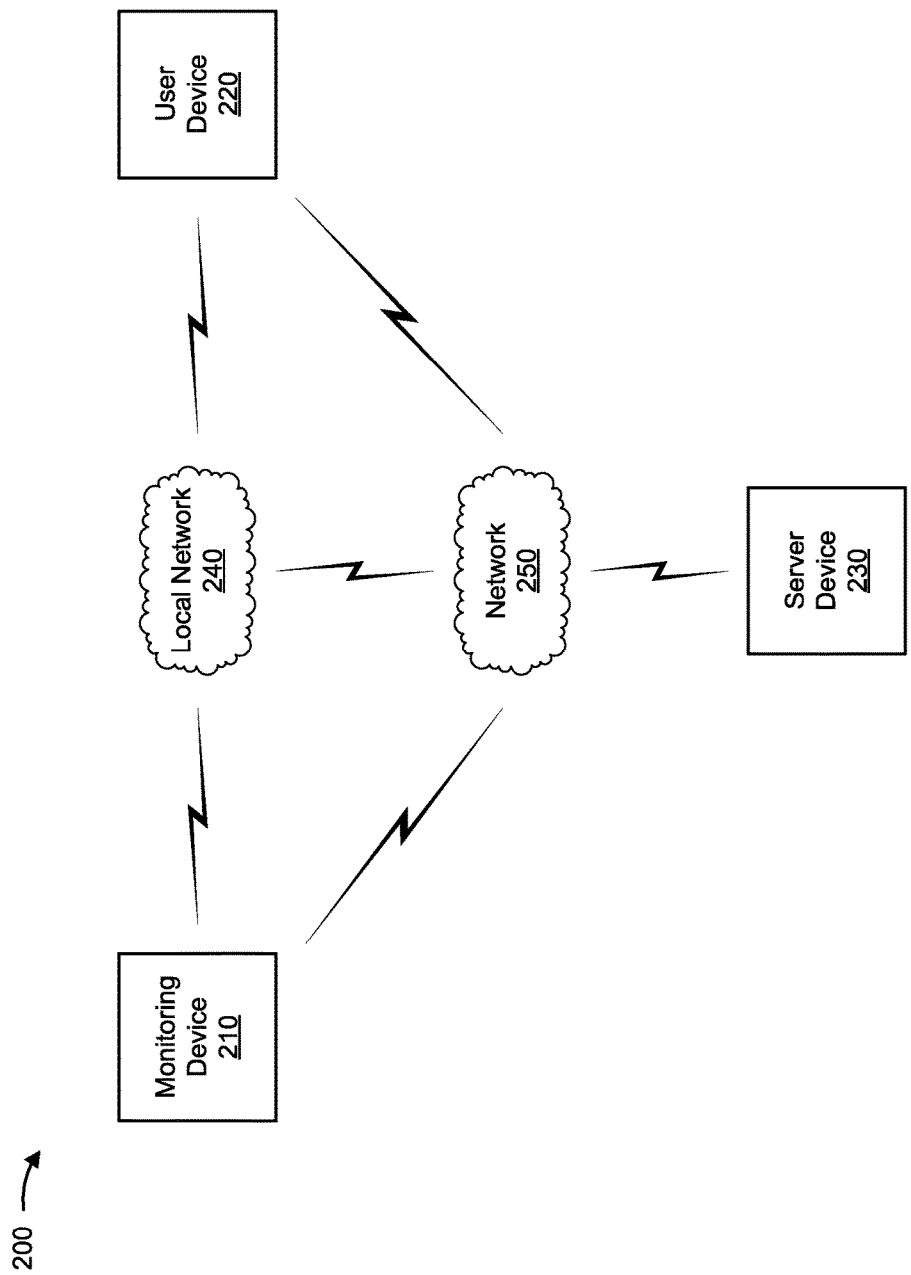
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a monitoring device 210, a user device 220, a server device 230, a local network 240, and a network 250. Devices of environment 200 may interconnect via wired connections, wireless connections, or a combination of wired and wireless connections.

Monitoring device 210 includes one or more devices capable of detecting a command. For example, monitoring device 210 may include a microphone, a camera, a biometric sensor, a speaker, a display and/or the like. In some implementations, monitoring device 210 may be a smart, always-on monitoring device that performs an action and/or provides information to a user upon detecting an audible command (e.g., a voice command and/or the like) and/or a gesture command (e.g., a facial gesture command, an eye gesture command, a hand gesture command, and/or the like). In some implementations, monitoring device 210 may detect an audible command and/or a gesture command may generate, based on the audible command and/or gesture command, an authentication request, and may send the authentication request to server device 230. In some implementations, monitoring device 210 may capture and/or send to server device 230 an audible response, a facial gesture response, a hand gesture response, and/or the like of a user, one or more sounds emitted by user device 220, one or more images and/or one or more videos displayed by user device 220, and/or the like. In some implementations, monitoring device 210 may receive and process a message, may display the message on a display of monitoring device 210, may emit the message via a speaker of monitoring device 210, and/or the like.

User device 220 includes one or more devices capable of receiving, generating, storing, processing, and/or providing information, such as the information described herein. For example, user device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 220 may generate and send a session initiation request to server device 230, may receive and process a message, may display the message on a display of user device 230. In some implementations, user device 220 may capture an input response (e.g., entered by a user via a keyboard, touchscreen, mouse, and/or the like of user device 220), may send information concerning the input to server device 230, and/or the like.

Server device 230 includes one or more devices capable of receiving, generating, storing, processing, and/or providing information, such as information described herein. For example, server device 230 may include a server device (e.g., a host server, a web server, an application server, etc.), a data center device, or a similar device. In some implementations, server device 230 may receive a registration request from monitoring device 210 and/or user device 220, may determine and/or store information (e.g., identification information) concerning monitoring device 210, user device 220, and/or the user, may authenticate monitoring device 210, user device 220, and/or the user, may determine a location of user device 220 and/or a location of monitoring device 210, and/or the like. In some implementations, server device 230 may determine that user device 220 and monitoring device 210 are collocated, may create a session token, may send the session token to user device 220, and/or the like.

Local network 240 includes one or more wired and/or wireless local networks. For example, local network 240 may include a local area network (LAN), a personal area network (PAN), a Wi-Fi network, a Bluetooth network, and/or the like, and/or a combination of these or other types of networks. In some implementations, monitoring device 210 and user device 220 may communicate with server device 230 via local network 240 and/or a device, such as a modem, router, and/or the like, associated with local network 240.

Network 250 includes one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a wide area network (WAN), a metropolitan area network (MAN), a telephone network (e.g., the Public Switched Telephone Network (PSTN)), a private network, an ad hoc network, an intranet, the internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
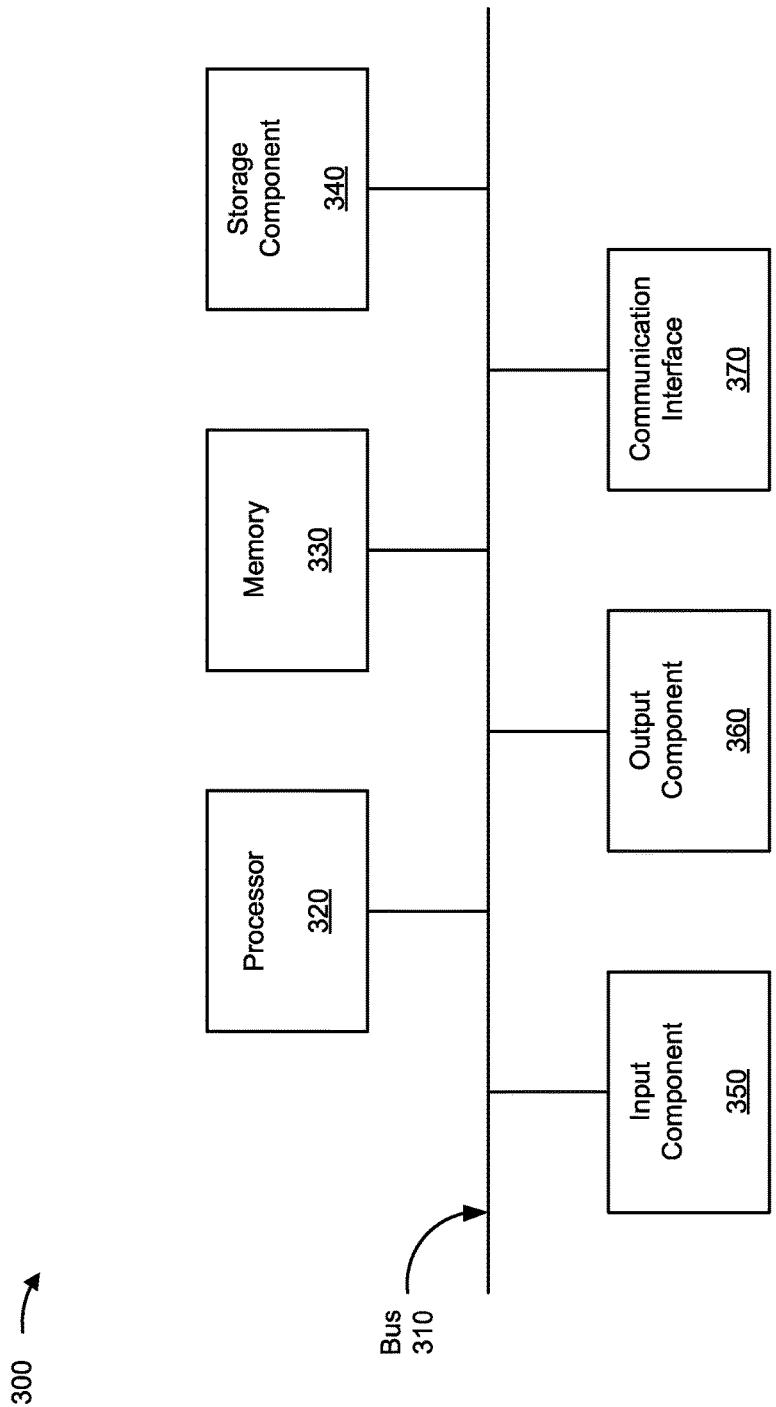
FIG. 3 is a diagram of example components of one or more devices of FIG. 2.

FIG. 3 is a diagram of example components of a device 300. Device 300 may correspond to monitoring device 210, user device 220, and/or server device 230. In some implementations, monitoring device 210, user device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
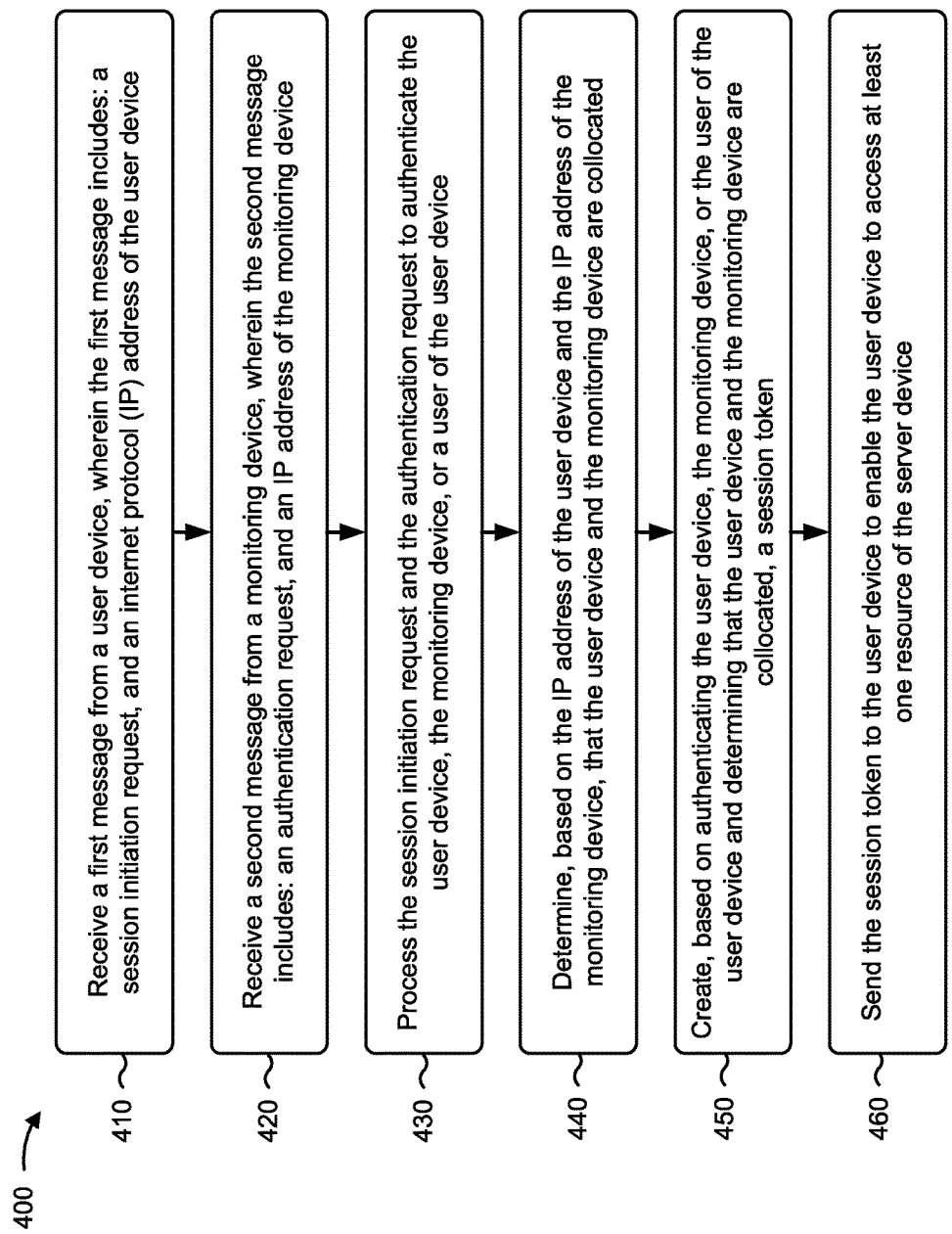
FIGS. 4-6 are flow charts of example processes for authenticating a user device via a monitoring device.

FIG. 4 is a flow chart of an example process 400 for authenticating a user device via a monitoring device. In some implementations, one or more process blocks of FIG. 4 may be performed by a server device (e.g., server device 230). In some implementations, one or more process blocks of FIG. 4 may be performed by another device or a group of devices separate from or including the server device, such as a monitoring device (e.g., monitoring device 210), a user device (e.g., user device 220), and/or the like.

As shown in FIG. 4, process 400 may include receiving a first message from a user device, wherein the first message includes a session initiation request, and an internet protocol (IP) address of the user device (block 410). For example, the server device (e.g., using processor 320, memory 330, storage component 340, communication interface 370, and/or the like) may receive a first message from a user device, as described above. In some implementations, the first message may include a session initiation request, and an internet protocol (IP) address of the user device.

As further shown in FIG. 4, process 400 may include receiving a second message from a monitoring device, wherein the second message includes an authentication request, and an IP address of the monitoring device (block 420). For example, the server device (e.g., using processor 320, memory 330, storage component 340, communication interface 370, and/or the like) may receive a second message from a monitoring device, as described above. In some implementations, the second message may include an authentication request, and an IP address of the monitoring device.

As further shown in FIG. 4, process 400 may include processing the session initiation request and the authentication request to authenticate the user device, the monitoring device, or a user of the user device (block 430). For example, the server device (e.g., using processor 320, memory 330, storage component 340, communication interface 370, and/or the like) may process the session initiation request and the authentication request to authenticate the user device, the monitoring device, or a user of the user device, as described above.

As further shown in FIG. 4, process 400 may include determining, based on the IP address of the user device and the IP address of the monitoring device, that the user device and the monitoring device are collocated (block 440). For example, the server device (e.g., using processor 320, memory 330, storage component 340, and/or the like) may determine, based on the IP address of the user device and the IP address of the monitoring device, that the user device and the monitoring device are collocated, as described above.

As further shown in FIG. 4, process 400 may include creating, based on authenticating the user device, the monitoring device, or the user of the user device and determining that the user device and the monitoring device are collocated, a session token (block 450). For example, the server device (e.g., using processor 320, memory 330, storage component 340, communication interface 370, and/or the like) may create, based on authenticating the user device, the monitoring device, or the user of the user device and determining that the user device and the monitoring device are collocated, a session token, as described above.

As further shown in FIG. 4, process 400 may include sending the session token to the user device to enable the user device to access at least one resource of the server device (block 460). For example, the server device (e.g., using processor 320, memory 330, storage component 340, communication interface 370, and/or the like) may send the session token to the user device to enable the user device to access at least one resource of the server device, as described above.

Process 400 may include additional implementations, such as any single implementation or any combination of implementations described below and/or in connection with one or more other processes described elsewhere herein.

In some implementations, the session initiation request may be associated with a browser extension of a browser running on the user device, and, when sending the session token to the user device to enable the user device to access the at least one resource of the server device, the server device may send the session token to the browser extension on the user device to enable the browser to communicate with the server device to access the at least one resource.

In some implementations, the server device may determine, after receiving the first message, a period of time during which the second message is to be received, and may determine, after receiving the second message, that the server device received the second message within the period of time.

In some implementations, the server device may receive, before receiving the first message, a first registration request from the user device and a second registration request from the monitoring device, and may determine, based on the first registration request and the second registration request, first identification information concerning the user device, the monitoring device, or the user of the user device. In some implementations, when processing the session initiation request and the authentication request to authenticate the user device, the monitoring device, or the user of the user device, the server device may determine, based on the session initiation request and the authentication request, second identification information concerning the user device, the monitoring device, or the user of the user device, and may compare the first identification information and the second identification information to authenticate the user device, the monitoring device, or the user of the user device.

In some implementations, the authentication request may include audio data, and, when processing the session initiation request and the authentication request to authenticate the user device, the monitoring device, or the user of the user device, the server device may process the audio data using a natural language processing technique to authenticate the user of the user device.

In some implementations, the authentication request may include audio data, and, when processing the session initiation request and the authentication request to authenticate the user device, the monitoring device, or the user of the user device, the server device may process the audio data to determine voice characteristics of the audio data, may obtain, based on the session initiation request, a voice profile concerning the user from a storage device, and may determine that the voice profile concerning the user matches the voice characteristics of the audio data.

In some implementations, the authentication request may include audio data, and, when processing the session initiation request and the authentication request to authenticate the user device, the monitoring device, or the user of the user device, the server device may process the audio data to determine one or more words, may obtain a password concerning the user from a storage device, and may determine that the password matches the one or more words.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
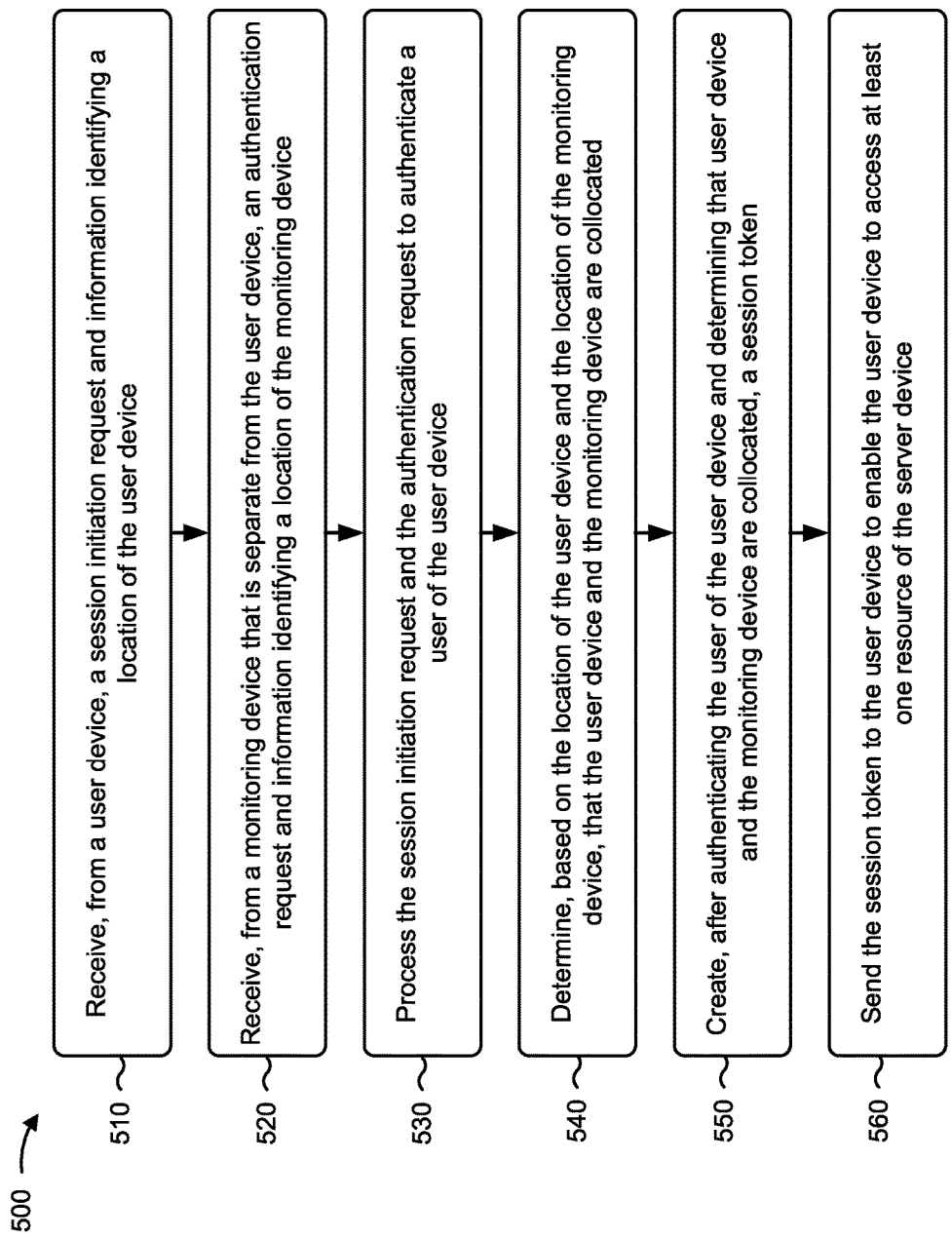

FIG. 5 is a flow chart of an example process 500 for authenticating a user device via a monitoring device. In some implementations, one or more process blocks of FIG. 5 may be performed by a server device (e.g., server device 230). In some implementations, one or more process blocks of FIG. 5 may be performed by another device or a group of devices separate from or including the server device, such as a monitoring device (e.g., monitoring device 210), a user device (e.g., user device 220), and/or the like.

As shown in FIG. 5, process 500 may include receiving, from a user device, a session initiation request and information identifying a location of the user device (block 510). For example, the server device (e.g., using processor 320, memory 330, storage component 340, communication interface 370, and/or the like) may receive, from a user device, a session initiation request and information identifying a location of the user device, as described above.

As further shown in FIG. 5, process 500 may include receiving, from a monitoring device that is separate from the user device, an authentication request and information identifying a location of the monitoring device (block 520). For example, the server device (e.g., using processor 320, memory 330, storage component 340, communication interface 370, and/or the like) may receive, from a monitoring device that is separate from the user device, an authentication request and information identifying a location of the monitoring device, as described above.

As further shown in FIG. 5, process 500 may include processing the session initiation request and the authentication request to authenticate a user of the user device (block 530). For example, the server device (e.g., using processor 320, memory 330, storage component 340, communication interface 370, and/or the like) may process the session initiation request and the authentication request to authenticate a user of the user device, as described above.

As further shown in FIG. 5, process 500 may include determining, based on the location of the user device and the location of the monitoring device, that the user device and the monitoring device are collocated (block 540). For example, the server device (e.g., using processor 320, memory 330, storage component 340, and/or the like) may determine, based on the location of the user device and the location of the monitoring device, that the user device and the monitoring device are collocated, as described above.

As further shown in FIG. 5, process 500 may include creating, after authenticating the user of the user device and determining that user device and the monitoring device are collocated, a session token (block 550). For example, the server device (e.g., using processor 320, memory 330, storage component 340, communication interface 370, and/or the like) may create, after authenticating the user of the user device and determining that user device and the monitoring device are collocated, a session token, as described above.

As further shown in FIG. 5, process 500 may include sending the session token to the user device to enable the user device to access at least one resource of the server device (block 560). For example, the server device (e.g., using processor 320, memory 330, storage component 340, communication interface 370, and/or the like) may send the session token to the user device to enable the user device to access at least one resource of the server device, as described above.

Process 500 may include additional implementations, such as any single implementation or any combination of implementations described below and/or in connection with one or more other processes described elsewhere herein.

In some implementations, the authentication request may include biometric data, and, when processing the session initiation request and the authentication request to authenticate the user of the user device, the server device may determine, based on the session initiation request, the user of the user device, may process the biometric data using a biometric identification technique to identify at least one biometric characteristic, and may authenticate, based on the at least one biometric characteristic, the user of the user device.

In some implementations, the authentication request may include video data, and, when processing the session initiation request and the authentication request to authenticate the user of the user device, the server device may determine, based on the session initiation request, a visual profile of the user of the user device, may process the video data to determine visual characteristics of the video data, and may authenticate, based on the visual profile and the visual characteristics, the user of the user device.

In some implementations, the authentication request may include audio data and video data, and, when processing the session initiation request and the authentication request to authenticate the user of the user device, the server device may determine, based on the session initiation request, the user of the user device, may process the video data using a facial recognition technique to identify a face, may process the audio data using an audio processing technique to identify a voice, and may authenticate, based on the face and the voice, the user of the user device.

In some implementations, when determining that the user device and the monitoring device are collocated, the server device may determine, based on the location of the user device and the location of the monitoring device, that the user device is located within a threshold distance of the monitoring device. In some implementations, when determining that the user device and the monitoring device are collocated, the server device may determine, based on the location of the user device and the location of the monitoring device, that the user device is located within a proximity area of the monitoring device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
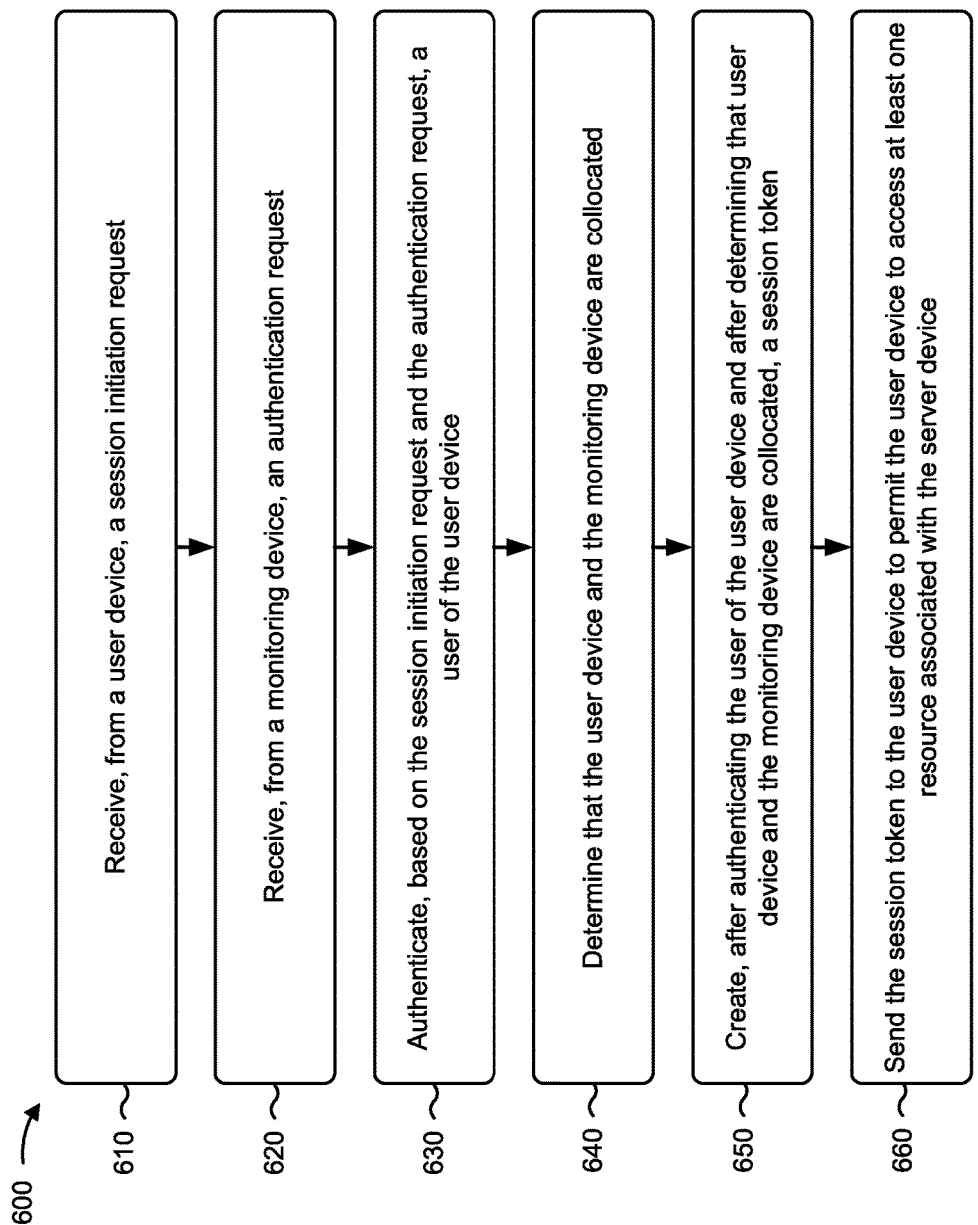

FIG. 6 is a flow chart of an example process 600 for authenticating a user device via a monitoring device. In some implementations, one or more process blocks of FIG. 6 may be performed by a server device (e.g., server device 230). In some implementations, one or more process blocks of FIG. 6 may be performed by another device or a group of devices separate from or including the server device, such as a monitoring device (e.g., monitoring device 210), a user device (e.g., user device 220), and/or the like.

As shown in FIG. 6, process 600 may include receiving, from a user device, a session initiation request (block 610). For example, the server device (e.g., using processor 320, memory 330, storage component 340, communication interface 370, and/or the like) may receive, from a user device, a session initiation request, as described above.

As further shown in FIG. 6, process 600 may include receiving, from a monitoring device, an authentication request (block 620). For example, the server device (e.g., using processor 320, memory 330, storage component 340, communication interface 370, and/or the like) may receive, from a monitoring device, an authentication request, as described above.

As further shown in FIG. 6, process 600 may include authenticating, based on the session initiation request and the authentication request, a user of the user device (block 630). For example, the server device (e.g., using processor 320, memory 330, storage component 340, communication interface 370, and/or the like) may authenticate, based on the session initiation request and the authentication request, a user of the user device, as described above.

As further shown in FIG. 6, process 600 may include determining that the user device and the monitoring device are collocated (block 640). For example, the server device (e.g., using processor 320, memory 330, storage component 340, and/or the like) may determine that the user device and the monitoring device are collocated, as described above.

As further shown in FIG. 6, process 600 may include creating, after authenticating the user of the user device and after determining that user device and the monitoring device are collocated, a session token (block 650). For example, the server device (e.g., using processor 320, memory 330, storage component 340, communication interface 370, and/or the like) may create, after authenticating the user of the user device and after determining that user device and the monitoring device are collocated, a session token, as described above.

As further shown in FIG. 6, process 600 may include sending the session token to the user device to permit the user device to access at least one resource associated with the server device (block 660). For example, the server device (e.g., using processor 320, memory 330, storage component 340, communication interface 370, and/or the like) may send the session token to the user device to permit the user device to access at least one resource associated with the server device, as described above.

Process 600 may include additional implementations, such as any single implementation or any combination of implementations described below and/or in connection with one or more other processes described elsewhere herein.

In some implementations, the session initiation request may include a username of the user of the user device, where the authentication request includes a password, and where authenticating the user of the user device includes determining that the password is associated with the username.

In some implementations, when determining that the user device and the monitoring device are collocated, the server device may send an instruction to the user device to cause the user device to display the instruction on a display of the user device, and the instruction may instruct the user of the user device to utter a response concerning the instruction than can be detected by the monitoring device. Additionally, when determining that the user device and the monitoring device are collocated, the server device may receive, from the monitoring device, the response concerning the instruction, and may determine, based on the response concerning the instruction, that the user device and the monitoring device are collocated.

In some implementations, when determining that the user device and the monitoring device are collocated, the server device may send a first message to the user device to cause the user device to emit at least one sound from a speaker of the user device, may receive, from the monitoring device, a second message concerning the at least one sound, and may determine, based on the second message, that the user device and the monitoring device are collocated.

In some implementations, when determining that the user device and the monitoring device are collocated, the server device may send a message to the monitoring device to cause the monitoring device to ask a question via a speaker of the monitoring device, where the question instructs the user of the user device to enter a response to the question via a user interface of the user device, may receive, from the user device, the response, and may determine, based on the response, that the user device and the monitoring device are collocated.

In some implementations, when determining that the user device and the monitoring device are collocated, the server device may determine a network address of the user device, may determine a network address of the monitoring device, and may determine, based on the network address of the user device and the network address of the monitoring device, that the user device and monitoring device are connected to a same local network. In some implementations, when sending the session token to the user device, the server device may receive, from the user device, a request concerning the session token, and may send, based on the request, the session token to the user device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A server device, comprising:
one or more memories; and
one or more processors, communicatively coupled to the one or more memories, to:
receive a first message from a user device,
wherein the first message includes:
a session initiation request, and
an internet protocol (IP) address of the user device;
receive a second message from a monitoring device,
wherein the second message includes:
an authentication request, and
an IP address of the monitoring device,
the authentication request being generated based on an audible command or gesture command received from a user associated with the user device;
process the session initiation request and the authentication request to authenticate the user device, the monitoring device, or a user of the user device;
determine, based on the IP address of the user device and the IP address of the monitoring device, that the user device and the monitoring device are collocated;
create, based on authenticating the user device, the monitoring device, or the user of the user device and determining that the user device and the monitoring device are collocated, a session token; and
send the session token to the user device to enable the user device to access at least one resource of the server device.

2. The server device of claim 1, wherein the session initiation request is associated with a browser extension of a browser running on the user device,
wherein the one or more processors, when sending the session token to the user device to enable the user device to access the at least one resource of the server device, are to:
send the session token to the browser extension on the user device to enable the browser to communicate with the server device to access the at least one resource.

3. The server device of claim 1, wherein the one or more processors are further to:
determine, after receiving the first message, a period of time during which the second message is to be received; and
determine, after receiving the second message, that the server device received the second message within the period of time.

4. The server device of claim 1, wherein the one or more processors are further to:
receive, before receiving the first message, a first registration request from the user device and a second registration request from the monitoring device; and determine, based on the first registration request and the second registration request, first identification information concerning the user device, the monitoring device, or the user of the user device,
wherein the one or more processors, when processing the session initiation request and the authentication request to authenticate the user device, the monitoring device, or the user of the user device, are to:
determine, based on the session initiation request and the authentication request, second identification information concerning the user device, the monitoring device, or the user of the user device; and
compare the first identification information and the second identification information to authenticate the user device, the monitoring device, or the user of the user device.

5. The server device of claim 1, wherein the authentication request includes audio data,
wherein the audio data includes the audio command, and
wherein the one or more processors, when processing the session initiation request and the authentication request to authenticate the user device, the monitoring device, or the user of the user device, are to:
process the audible command using a natural language processing technique to authenticate the user of the user device.

6. The server device of claim 1, wherein the authentication request includes audio data,
wherein the audio data includes the audio command, and
wherein the one or more processors, when processing the session initiation request and the authentication request to authenticate the user device, the monitoring device, or the user of the user device, are to:
process the audible command to determine voice characteristics of the audible command;
obtain, based on the session initiation request, a voice profile concerning the user from a storage device; and
determine that the voice profile concerning the user matches the voice characteristics of the audible command.

7. The server device of claim 1, wherein the authentication request includes audio data,
wherein the audio data includes the audio command, and
wherein the one or more processors, when processing the session initiation request and the authentication request to authenticate the user device, the monitoring device, or the user of the user device, are to:
process the audible command to determine one or more words;
obtain a password concerning the user from a storage device; and
determine that the password matches the one or more words.

8. A non-transitory computer-readable medium storing instructions, the instructions comprising:
one or more instructions that, when executed by one or more processors of a server device, cause the one or more processors to:
receive, from a user device, a session initiation request and information identifying a location of the user device;
receive, from a monitoring device that is separate from the user device, an authentication request and information identifying a location of the monitoring device,
the authentication request being generated based on an audible command or gesture command received from a user associated with the user device;
process the session initiation request and the authentication request to authenticate a user of the user device;
determine, based on the location of the user device and the location of the monitoring device, that the user device and the monitoring device are collocated;
create, after authenticating the user of the user device and determining that user device and the monitoring device are collocated, a session token; and
send the session token to the user device to enable the user device to access at least one resource of the server device.

9. The non-transitory computer-readable medium of claim 8, wherein the authentication request includes biometric data,
wherein the one or more instructions, that cause the one or more processors to process the session initiation request and the authentication request to authenticate the user of the user device, cause the one or more processors to:
determine, based on the session initiation request, the user of the user device;
process the biometric data using a biometric identification technique to identify at least one biometric characteristic; and
authenticate, based on the at least one biometric characteristic, the user of the user device.

10. The non-transitory computer-readable medium of claim 8, wherein the authentication request includes video data,
wherein the one or more instructions, that cause the one or more processors to process the session initiation request and the authentication request to authenticate the user of the user device, cause the one or more processors to:
determine, based on the session initiation request, a visual profile of the user of the user device;
process the video data to determine visual characteristics of the video data; and
authenticate, based on the visual profile and the visual characteristics, the user of the user device.

11. The non-transitory computer-readable medium of claim 8, wherein the authentication request includes audio data and video data,
wherein the audio data includes the audio command, and
wherein the one or more instructions, that cause the one or more processors to process the session initiation request and the authentication request to authenticate the user of the user device, cause the one or more processors to:
determine, based on the session initiation request, the user of the user device;
process the video data using a facial recognition technique to identify a face;
process the audible command using an audio processing technique to identify a voice; and
authenticate, based on the face and the voice, the user of the user device.

12. The non-transitory computer-readable medium of claim 8, wherein the one or more instructions, that cause the one or more processors to determine that the user device and the monitoring device are collocated, cause the one or more processors to:

determine, based on the location of the user device and the location of the monitoring device, that the user device is located within a threshold distance of the monitoring device.

13. The non-transitory computer-readable medium of claim 8, wherein the one or more instructions, that cause the one or more processors to determine that the user device and the monitoring device are collocated, cause the one or more processors to:
   determine, based on the location of the user device and the location of the monitoring device, that the user device is located within a proximity area of the monitoring device.

14. A method, comprising:
   receiving, by a server device and from a user device, a session initiation request;
   receiving, by the server device and from a monitoring device, an authentication request,
      the authentication request being generated based on an audible command or gesture command received from a user associated with the user device;
   authenticating, by the server device and based on the session initiation request and the authentication request, a user of the user device;
   determining, by the server device, that the user device and the monitoring device are collocated;
   creating, by the server device after authenticating the user of the user device and after determining that user device and the monitoring device are collocated, a session token; and
   sending, by the server device, the session token to the user device to permit the user device to access at least one resource associated with the server device.

15. The method of claim 14, wherein the session initiation request includes a username of the user of the user device,
   wherein the authentication request includes a password,
      wherein authenticating the user of the user device comprises:
         determining that the password is associated with the username.

16. The method of claim 14, wherein determining that the user device and the monitoring device are collocated comprises:
   sending an instruction to the user device to cause the user device to display the instruction on a display of the user device,
      wherein the instruction instructs the user of the user device to utter a response concerning the instruction than can be detected by the monitoring device;
   receiving, from the monitoring device, the response concerning the instruction; and
   determining, based on the response concerning the instruction, that the user device and the monitoring device are collocated.

17. The method of claim 14, wherein determining that the user device and the monitoring device are collocated comprises:
   sending a first message to the user device to cause the user device to emit at least one sound from a speaker of the user device;
   receiving, from the monitoring device, a second message concerning the at least one sound; and
   determining, based on the second message, that the user device and the monitoring device are collocated.

18. The method of claim 14, wherein determining that the user device and the monitoring device are collocated comprises:
   sending a message to the monitoring device to cause the monitoring device to ask a question via a speaker of the monitoring device,
      wherein the question instructs the user of the user device to enter a response to the question via a user interface of the user device;
   receiving, from the user device, the response; and
   determining, based on the response, that the user device and the monitoring device are collocated.

19. The method of claim 14, wherein determining that the user device and the monitoring device are collocated comprises:
   determining a network address of the user device;
   determining a network address of the monitoring device; and
   determining, based on the network address of the user device and the network address of the monitoring device, that the user device and monitoring device are connected to a same local network.

20. The method of claim 14, wherein sending the session token to the user device comprises:
   receiving, from the user device, a request concerning the session token; and
   sending, based on the request, the session token to the user device.

* * * * *